United States Patent [19]

Matsuyama

[11] 4,167,282

[45] Sep. 11, 1979

[54] IMPACT ABSORBING TYPE BUMPER

[75] Inventor: Mitsunobu Matsuyama, Tokyo, Japan

[73] Assignee: Nissan Motor Company, Limited, Japan

[21] Appl. No.: 822,941

[22] Filed: Aug. 8, 1977

[30] Foreign Application Priority Data

Aug. 10, 1976 [JP] Japan .............................. 51-107504[U]

[51] Int. Cl.² ............................................. B60R 19/06
[52] U.S. Cl. .................................. 293/102; 293/121; 293/136; 293/120
[58] Field of Search ...................... 293/1, 60, 63, 69 R, 293/70, 71 R, 73, 98, 99, 88, 89, 95, 96, 65, 67, 75, 87

[56] References Cited

U.S. PATENT DOCUMENTS

| | | |
|---|---|---|
| 2,062,327 | 12/1936 | Morrison .................................. 293/88 |
| 3,451,710 | 6/1969 | Savell ...................................... 293/99 |
| 3,830,539 | 8/1974 | Yoshie et al. ........................... 293/63 |
| 3,836,188 | 9/1974 | Klees ....................................... 293/95 |
| 3,841,682 | 10/1974 | Church et al. ...................... 293/71 R |
| 3,884,516 | 5/1975 | Gallion et al. ..................... 293/71 R |
| 4,030,744 | 6/1977 | Schwuchow et al. ............. 293/71 R |

Primary Examiner—Charles E. Frankfort
Attorney, Agent, or Firm—Lane, Aitken & Ziems

[57] ABSTRACT

The invention relates to an arrangement of a visual shield in the form of an apron bridging the space between an impact receiving member and the end of a vehicle body frame to conceal the mechanical structure. The impact receiving member is located a considerable distance from the end of the vehicle body frame and secured to shock absorbers mounted to the vehicle body frame. An elastomeric spacer is disposed between the visual shield and the impact receiving member so as to prevent direct contact of the visual shield with the impact receiving member.

13 Claims, 9 Drawing Figures

IMPACT ABSORBING TYPE BUMPER

BACKGROUND OF THE INVENTION

The present invention relates to end constructions of motor vehicles comprising an impact receiving member secured to shock absorbers mounted to a vehicle body frame, and an apron bridging the space between the impact receiving member and the end of the vehicle body frame to conceal the mechanical structure, serving as a visual shield.

Known impact absorbing type bumpers comprise an impact receiving member secured to shock absorbers mounted to a vehicle body frame. To secure the stroke of the impact receiving member during telescopic energy absorbing action of the shock absorbers, the impact receiving member is located a considerable distance from the end of the vehicle body frame. To conceal the mechanical structure, an apron bridges the space between the impact receiving member and the end of the vehicle body frame.

Such an apron is made of a metal plate and has one end attached to the end of the vehicle body and an opposite free end adjacent to and over the impact receiving member. The free end of the metal plate is spaced a distance from the upper surface of the impact receiving member. The space between the free end of the metal plate and the upper surface of the impact receiving member should be as narrow as possible. However, narrowing this space will cause the metal plate to damage the upper surface of the impact receiving member because the metal plate will rattle to contact with the upper surface of the impact receiving member during operation of the vehicle.

As an apron, the use of a thin rubber plate is known. For example, such a thin rubber plate has one end fixed to the impact receiving member and an opposite free end contacting with the vehicle body. Employing such a rubber plate, however, will raise manufacturing costs. Another drawback is that the rubber plate is very difficult and expensive to be painted with the same color as that of the vehicle body.

SUMMARY OF THE INVENTION

It is therefore an object of the present invention to provide a shock absorbing type bumper having an impact receiving member located a considerable distance from the end of a vehicle body, an apron, serving as a visual shield, and means for preventing direct contact of the apron with the impact receiving member which otherwise would occur due to rattling of the apron during operation of the vehicle.

BRIEF DESCRIPTION OF THE DRAWINGS

The invention will be further described hereinafter with reference to the accompanying drawings, in which.

DETAILED DESCRIPTION OF PREFERRED EMBODIMENTS

Figure 1:
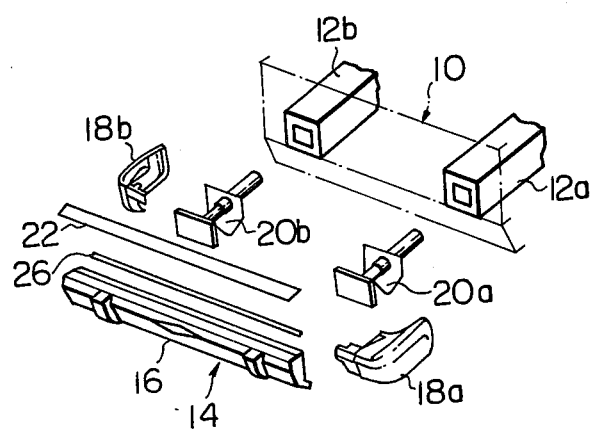
FIG. 1 is an exploded perspective view of an impact absorbing type bumber.

Referring now to the drawings, the same reference numerals are used through all Figures to designate similar parts.

Figure 2:
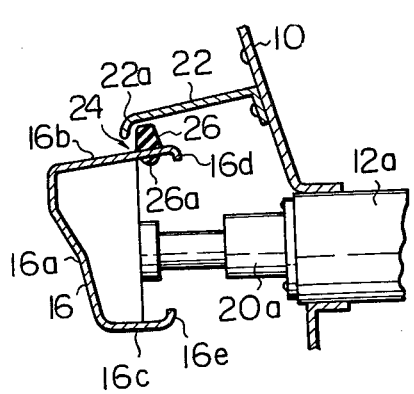
FIG. 2 is a longitudinal sectional view of the impact absorbing type bumper shown in FIG. 1, showing a first embodiment of the invention.

Referring to the first embodiment shown in FIGS. 1 and 2, a vehicle body is illustrated in phantom line and designated by 10. The vehicle body has a frame including two side members 12a and 12b. An impact receiving member 14 has a central beam section 16 and two side sections 18a and 18b (see FIG. 1) adapted to be connected to opposite ends of the central beam section 16, respectively. As best seen in FIG. 2, the central beam section 16 has a channel-like cross section and has a front portion 16a, an upper portion 16b and a lower portion 16c. The upper and lower portions 16b and 16c extend from the front portion 16a to form the channel-like cross section. The upper portion 16b has one end curved toward the lower portion 16c to form an upper flange 16d, whereas the lower portion 16c has one end curved toward the upper portion 16b to form a lower flange 16e. The impact receiving member 14 is located a considerable distance from the end of the vehicle body frame and securely attached to two shock absorbers 20a and 20b mounted to the side members 12a and 12b of the vehicle body frame, respectively.

The impact absorbing type bumper constructed as above is of the conventional type and will operate such that exerting longitudinal force of a somewhat larger magnitude on the central beam section 16 will cause the impact receiving member 14 to move toward the vehicle body 10. Under this condition the shock absorbers 20a and 20b will telescopically retract, in an energy absorbing manner, to allow this movement of the impact receiving member 14.

A space is provided, therefore, to permit the movement of the impact receiving member 14 as explained above. To conceal the mechanical structure, a visual shield, in the form of an apron 22 made of a rigid flat plate is provided. The apron 22 has one end attached to the vehicle body 10 and bridges the space between the impact receiving member 14 and the end of the vehicle body 10 (see FIG. 2). The apron 22 has an opposite free end 22a bent downwardly toward the upper portion 16b of the central beam section 16 to reduce a clearance space between the upper portion 16b and the opposite end 22a.

To prevent direct contact of the apron 22 with the upper portion 16b of the central beam section 16, an elastomeric spacer generally designated by the reference numeral 24 is disposed between the apron 22 and the impact receiving member 14. The elastomeric spacer has an elastomeric member 26 with a portion 26a press fitted into the upper portion 16b of central beam section 16 (see FIG. 2). The elastomeric member 26 is so dimensioned as to prevent interference contact of the apron 22 with the upper portion 16b of the central beam section 16 upon rattling of the apron 22 during operation of the vehicle. The elastomeric member 26 may be elongate and extends along the central beam section 16 of the impact receiving member 14 as shown in FIG. 1.

Alternatively, the elastomeric spacer may comprise a plurality of plug-shaped elastomeric member disposed on the upper portion 16b of the central beam section 16 and spaced along the central beam section 16. Another possibility is that the elastomeric spacer comrpises two elastomeric members, each in the form of a projection integrally formed on one of the side sections 18a and 18b of the impact receiving member 14.

Although in the embodiment shown in FIGS. 1 and 2, the elastomeric spacer 24 is out of contact with the apron 22, the elastomeric member 26 may be dimensioned so as to contact with the apron 22, if desired.

It will be understood that the provision of the elastomeric spacer 24 will prevent direct contact of the apron 22 with the impact receiving member, thus preventing occurrence of mechanical damage on the impact receiving member 14 and mechanical noise and permit relative movement between the impact receiving member and the apron upon impact.

Figure 3:
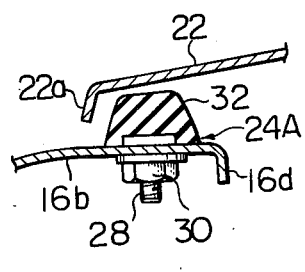
FIG. 3 is a part of FIG. 2, showing a second embodiment of the invention.

Referring to the embodiment shown in FIG. 3, an elastomeric spacer 24A comprises a stud bolt 28 securely attached to an upper portion 16b of a central beam section 16 by means of a mate nut 30 and an elastomeric member 32 adhered to the stud bolt 28.

Figure 4:
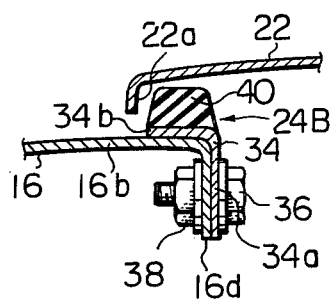
FIG. 4 is a similar view to FIG. 3, showing a third embodiment of the invention.

Referring to the embodiment shown in FIG. 4, an elastomeric spacer 24B comprises an L-shaped bracket 34 having a first portion 34a formed with a bolt receiving aperture (not shown) and a second portion 34b extending generally perpendicularly from the first portion 34a. A stud bolt 36 and a nut 38 cooperate to securely attach the first portion 34a of the L-shaped bracket 34 to an upper flange 16d of a central beam section 16 with the second portion 34b contacting with an upper portion 16b of the central beam section 16. An elastomeric member 40 of the spacer 24B is adhered to the second portion 34b of the L-shaped bracket 34.

Figure 5:
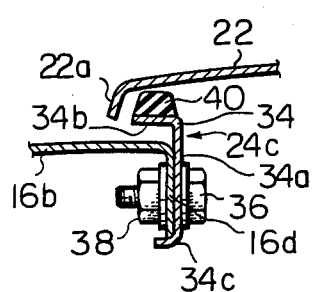
FIG. 5 is a similar view to FIG. 3, showing a fourth embodiment of the invention.

The embodiment shown in FIG. 5 is different from the FIG. 4 embodiment in that an elastomeric spacer 24C has an L-shaped bracket 34 having a flange 34c extending from a first portion 34a in the same direction as second portion 34b extends, and that the L-shaped bracket 34 is attached to the upper flange 16d of the central beam section 16 with the flange 34 thereof engaging an edge of the upper flange 16d and with the second portion 34b thereof disposed over the upper portion 16b of the central beam section 16. The flange 34c serves to prevent rotation of the L-shaped bracket 34 about the stud bolt 36. It will be noted that with this arrangement the amount of elastomeric member 40 can be reduced.

Figure 6:
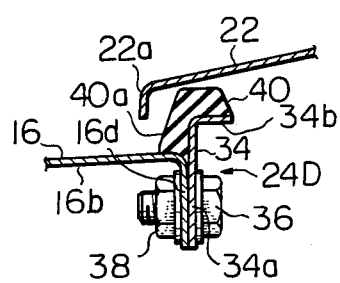
FIG. 6 is a similar view to FIG. 3, showing a fifth embodiment of the invention.

The embodiment shown in FIG. 6 is different from the FIG. 4 embodiment in that an L-shaped bracket 34 of an elastomeric spacer 24D is attached to an upper flange 16d of a central beam section 16 with its second portion 34b directed away from an upper portion 16b of the central beam section 16 and an elastomeric member 40 adhered to the second portion 34b has a downwardly extending portion 40a contacting with the upper portion 16b of the central beam section 16. It will be noted that the contact of downwardly extending portion 40a with the upper portion 16b prevents the L-shaped bracket 34 from rotation about the stud 36.

Figure 7:
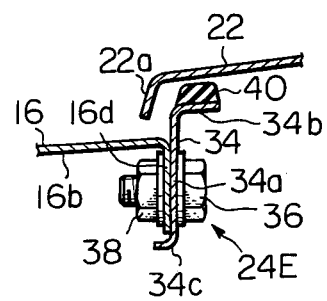
FIG. 7 is a similar view to FIG. 3, showing a sixth embodiment of the invention.

The embodiment shown in FIG. 7 is different from the FIG. 5 embodiment in that a flange 34c of a first portion 34a of an L-shaped bracket of an elastomeric spacer 24E extends in the opposite direction to a second portion 34b, and the second portion 34b is directed away from an upper portion 16b of a central beam section 16. With the arrangement shown in FIG. 7, a distance X (see FIG. 7) can be reduced as compared to the arrangement shown in FIG. 5. Therefore, part weights and costs can be reduced.

Figure 8:
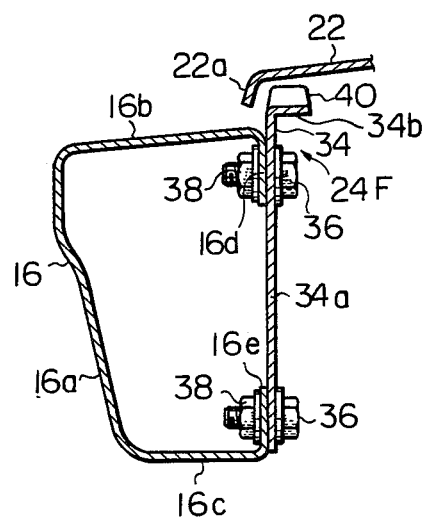
FIG. 8 is a similar view to FIG. 2, showing a seventh embodiment of the invention.

Referring to FIG. 8, the embodiment shown herein is different from FIG. 6 embodiment in that a first portion 34a of an L-shaped bracket 34 of an elastomeric spacer 24F is designed to extend between an upper flange 16d and a lower flange 16e of a central beam section 16 and formed at two bolt receiving apertures (not shown), and in that the first portion 34a is attached to the upper and lower flanges 16d and 16e to close a space between the upper and lower flanges. A second portion 34b is directed away from the upper portion 16b of the central beam section 16, as shown. This arrangement will help to increase rigidity of the central beam section 16 of the impact receiving member 14.

A bolt receiving aperture formed in the first portion 34a of each of the L-shaped bracket 34 shown in FIGS. 4 through 8 is an elongate hole so extending to permit relative upward and downward (viewing in each Figure) movement of the L-shaped bracket relative to the stud bolt 36 as long as the bolt 36 is in loose engagement condition, so that the location of the elastomeric member 40 may be adjusted easily.

Figure 9:
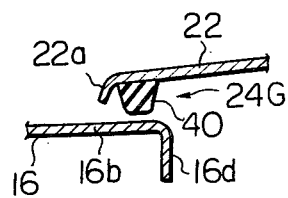
FIG. 9 is a similar view to FIG. 3, showing a eighth embodiment of the invention.

Referring to the embodiment shown in FIG. 9, an elastomeric spacer 24G comprises an elastomeric member 40 adhered to an apron 22 and positioned over an upper portion 16b of a central beam section 16.

It will now be understood from an explanation of various preferred embodiments of the invention that occurrence of mechanical damage on an impact receiving member and mechanical noise can be prevented without any deterioration to visual appearance of the vehicle to which an impact absorbing type bumper is installed.

What is claimed is:

1. An impact absorbing type bumper in combination with a vehicle body frame, comprising:

an impact receiving member located a distance from the end of the vehicle body frame, said impact receiving member being securely attached to at least one shock absorber mounted to the vehicle body frame, said impact receiving member comprising a central beam section and two side sections, said central beam section having a channel-like cross section and having a front portion, an upper portion and a lower portion, said upper portion and said lower portion extending toward the vehicle body frame from said front portion to form said channel-like cross section;

an apron in the form of a rigid plate having one end attached to the vehicle body, said apron bridging a space between said impact receiving member and the end of the vehicle body, said apron having a flange portion at the other end thereof which extends toward said impact receiving member to juxtapose said impact receiving member; and an elastomeric spacer disposed between and mounted to one of said apron and said impact receiving member to prevent direct contact of said apron with said impact receiving member and arranged to be inward of said flange portion and spaced from the other one of said apron and impact receiving member and so that relative movement between said impact receiving member and said apron in the direction of said vehicle body frame can occur without contact between said elastomeric spacer and said other of said apron and impact receiving member throughout the full compression of said at least one shock absorber.

2. An impact absorbing type bumper as claimed in claim 1, in which said elastomeric spacer is directly attached to said impact receiving member.

3. An impact receiving type bumper as claimed in claim 1, in which said elastomeric spacer is attached to said impact receiving member by means of a bracket.

4. An impact absorbing type bumper as claimed in claim 1, in which said elastomeric spacer has an elastomeric member with a portion press fitted into said upper portion of said central beam section.

5. An impact absorbing type bumper as claimed in claim 1, in which said elastomeric spacer comprises a stud bolt securely attached to said upper portion of said central beam section by a nut and an elastomeric member adhered to said stud bolt.

6. An impact absorbing type bumper as claimed in claim 1, in which said elastomeric spacer comprises:
an L-shaped bracket having a first portion securely attached to said central beam section and a second portion extending generally perpendicularly from said first portion;
an elastomeric member adhered to said second portion of said L-shaped bracket.

7. An impact absorbing type bumper as claimed in claim 1, in which said elastomeric spacer comprises:
an elastomeric member adhered to said apron and positioned over said upper portion of said central beams section.

8. An impact absorbing type bumper as claimed in claim 1, in which said elastomeric spacer comprises an elongate elastomeric member disposed on an upper portion of said central beam section of said impact receiving member and extending along said central beam section.

9. An impact absorbing type bumper as claimed in claim 1, in which said elastomeric spacer comprises a plurality of plug-shaped elastomeric members disposed on an upper portion of said central beam section of said impact receiving member and spaced along said central beam section.

10. An impact absorbing type bumper in combination with a vehicle body frame, comprising:
an impact receiving member located a distance from the end of the vehicle body frame, said impact receiving member being securely attached to at least one shock absorber mounted to the vehicle body frame, said impact receiving member comprising a central beam section and two side sections, said central beam section having a channel-like cross section and having a front portion, an upper portion including a first flange, and a lower portion, said upper portion and said lower portion extending toward the vehicle body frame from said front portion to form said channel-like cross section;
an apron in the form of a rigid plate having one end attached to the vehicle body, said apron bridging a space between said impact receiving member and the end of the vehicle body; and
an elastomeric spacer disposed between said apron and said impact receiving member to prevent direct contact of said apron with said impact receiving member; said elastomeric spacer comprising:
an L-shaped bracket having a first portion formed with a bolt receiving aperture and a second portion extending generally perpendicularly from said first portion and said first portion having at one end thereof a flange extending in the same direction as said second portion does;
a stud bolt and a nut means for securely attaching said first portion of said L-shaped bracket to said first flange of said central beam section with said flange of said L-shaped bracket engaging an edge of said first flange of said central beam section and with said second portion of said L-shaped bracket disposed over said upper portion of said central beam section; and
an elastomeric member adhered to said second portion of said L-shaped bracket.

11. An impact absorbing type bumper in combination with a vehicle body frame, comprising:
an impact receiving member located a distance from the end of the vehicle body frame, said impact receiving member being securely attached to at least one shock absorber mounted to the vehicle body frame, said impact receiving member comprising a central beam section and two side sections, said central beam section having a channel-like cross section and having a front portion, an upper portion including a first flange, and a lower portion, said upper portion and said lower portion extending toward the vehicle body frame from said front portion to form said channel-like cross section;
an apron in the form of a rigid plate having one end attached to the vehicle body, said apron bridging a space between said impact receiving member and the end of the vehicle body; and
an elastomeric spacer disposed between said apron and said impact receiving member to prevent direct contact of said apron with said impact receiving member; said elastomeric spacer comprising:
an L-shaped bracket having a first portion formed with a bolt receiving aperture and a second portion extending generally perpendicularly from said first portion and towards the vehicle body frame;
a stud bolt and nut means for securely attaching said first portion of said L-shaped bracket to said first flange of said central beam section with said second portion of said L-shaped bracket directed away from said upper portion of said central beam section; and
an elastomeric member adhered to said second portion of said L-shaped bracket and having a portion contacting with said upper portion of said central beam section.

12. An impact absorbing type bumper in combination with a vehicle body frame, comprising:
an impact receiving member located a distance from the end of the vehicle body frame, said impact receiving member being securely attached to at least one shock absorber mounted to the vehicle body frame, said impact receiving member comprising a central beam section and two side sections, said central beam section having a channel-like cross section and having a front portion, an upper portion including a first flange, and a lower portion, said upper portion and said lower portion extending toward the vehicle body frame from said front portion to form said channel-like cross section;

an apron in the form of a rigid plate having one end attached to the vehicle body, said apron bridging a space between said impact receiving member and the end of the vehicle body; and an elastomeric spacer disposed between said apron and said impact receiving member to prevent direct contact of said apron with said impact receiving member; said elastomeric spacer comprising:

an L-shaped bracket having a first portion formed with a bolt receiving aperture and a second portion formed extending generally perpendicularly from said first portion and toward the vehicle body frame, said first portion having at one end thereof a flange extending in the opposite direction to said second portion does;

a stud bolt and a nut means for securely attaching said first portion of said L-shaped bracket to said first flange of said central beam section with said second portion of said L-shaped bracket directed away from said upper portion of said central beam section and with said flange of said L-shaped bracket engaging an edge of said first flange of said central beam section; and an elastomeric member adhered to said second portion of said L-shaped bracket.

13. An impact absorbing type bumper in combination with a vehicle body frame, comprising:

an impact receiving member located a distance from the end of the vehicle body frame, said impact receiving member being securely attached to at least one shock absorber mounted to the vehicle body frame, said impact receiving member comprising a central beam section and two side sections, said central beam section having a channel-like cross section and having a front portion, an upper portion including a first flange, and a lower portion including a second flange, said upper portion and said lower portion extending toward the vehicle body frame from said front portion to form said channel-like cross section;

an apron in the form of a rigid plate having one end attached to the vehicle body, said apron bridging a space between said impact receiving member and the end of the vehicle body; and an elastomeric spacer disposed between said apron and said impact receiving member to prevent direct contact of said apron with said impact receiving member; said elastomeric spacer comprising:

an L-shaped bracket having a first portion and a second portion extending generally perpendicularly from said first portion;

at least two stud bolts and nuts for securely attaching said first portion to said L-shaped bracket to said first and second flanges of said central beam section with said second portion of said L-shaped bracket directed away from said upper portion of said central beam section; and an elastomeric member adhered to said second portion of said L-shaped bracket.

* * * * *